(12) United States Patent
Chou

(10) Patent No.: US 7,095,457 B2
(45) Date of Patent: Aug. 22, 2006

(54) LCD TELEVISION WITH DETACHABLE BACKLIGHT MODULE

(75) Inventor: Chin-Wen Chou, Hsin-Tien (TW)

(73) Assignee: Shin Jiuh Corp., Taipei Hsien (TW)

( * ) Notice: Subject to any disclaimer, the term of this patent is extended or adjusted under 35 U.S.C. 154(b) by 516 days.

(21) Appl. No.: 10/314,294

(22) Filed: Dec. 9, 2002

(65) Prior Publication Data

US 2004/0109095 A1 Jun. 10, 2004

(51) Int. Cl.
*H04N 5/64* (2006.01)

(52) U.S. Cl. .................................... 348/794; 345/102

(58) Field of Classification Search ................. 348/790, 348/794; 345/87, 102; 362/632–634; 349/65, 349/58; 248/917, 918; 315/498
See application file for complete search history.

(56) References Cited

U.S. PATENT DOCUMENTS

| | | | | |
|---|---|---|---|---|
| 4,635,128 A | * | 1/1987 | Toyoda | 348/794 |
| 5,302,985 A | * | 4/1994 | Kennedy et al. | 353/122 |
| 6,087,787 A | * | 7/2000 | Williams | 315/307 |
| 6,243,068 B1 | * | 6/2001 | Evanicky et al. | 345/102 |
| 6,409,356 B1 | * | 6/2002 | Nishimura | 362/632 |
| 6,611,249 B1 | * | 8/2003 | Evanicky et al. | 345/102 |
| 6,710,898 B1 | * | 3/2004 | Chang | 358/474 |

FOREIGN PATENT DOCUMENTS

TW 342950 8/1997

\* cited by examiner

*Primary Examiner*—Victor R. Kostak
(74) *Attorney, Agent, or Firm*—Birch, Stewart, Kolasch & Birch, LLP

(57) ABSTRACT

A detachable backlight module of LCD TV comprises a casing with a detaching opening, a screen disposed in the front section of the casing, a detachable lamp rack disposed behind the screen and corresponding to the detaching opening, and a main circuit board disposed behind the detachable lamp rack; the main circuit board drives an illumination unit on the detachable lamp rack to evenly diffuse the light produced by the illumination unit through the screen to a plane light source and the detachable lamp rack can be detached from the detachable opening easily, and the foregoing constitute the detachable backlight module of a LCD television.

16 Claims, 4 Drawing Sheets

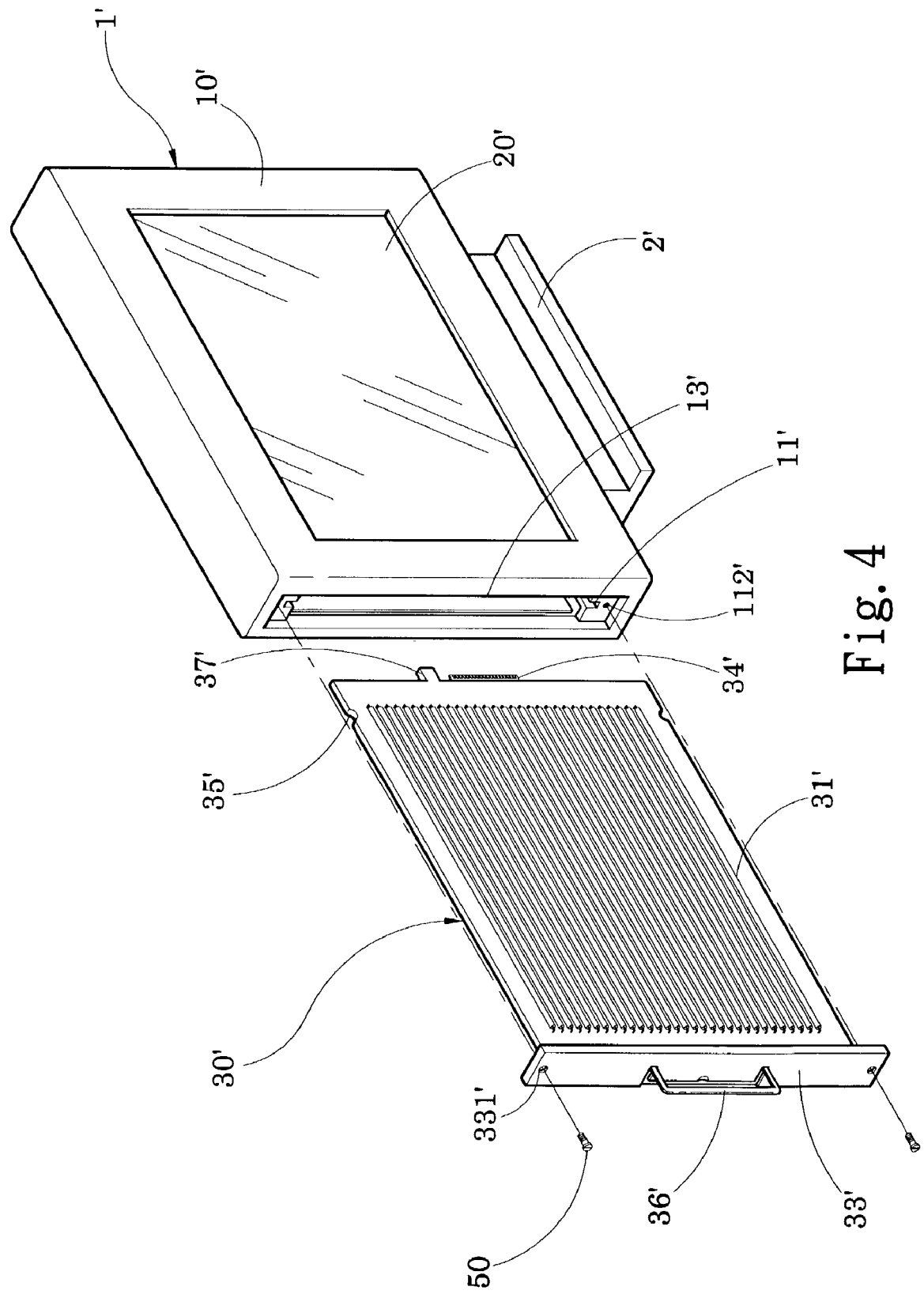

LCD TELEVISION WITH DETACHABLE BACKLIGHT MODULE

FIELD OD THE INVENTION

The present invention relates to a LCD television with detachable backlight module, more particularly to a LCD television with detachable backlight module used for entertainment, education, or medical treatment.

BACKGROUND OF THE INVENTION

As the national income is growing, the demand for life quality is getting higher and higher. Since the volume of traditional cathode ray tube television (CRT TV) is large in addition to its problem of loosing originality of color and proportion, CRT TV is eliminated gradually. The Thin Film Transistor Liquid Crystal Display (TFT-LCD) and Plasma Display Panel (PDP) will replace the CRT. However, ordinary consumers are not able to afford the price of the common large PDP television in the market. Therefore, the LCD television is considered to be the product of the next generation of the CRT television.

Most of the LCD televisions require a backlight module as the light source; the so-called backlight stands for the position of the light source coming from the backside of the liquid crystal panel. The basic structure of a backlight module mainly includes 3 main sections: light source, light guide plate, and optical film. The light source is divided into the following types: cold cathode fluorescent lamp (CCFL), hot cathode fluorescent lamp (HCFL), and light emitting diode (LED). The number of lamps can be changed according to the size of LCD television; generally speaking, the LCD television generally has about 2–40 lamps. The light guide plate uses the wedge type or panel type light guide plate to nebulize the linear light source produced by the light source and to generate an even area light source. The optical film will direct the non-scattering beam onto the reflector of the light guide plate according to different specific functions, so that the beam forms a diffusion and evenly diffuses the diffusion sheet to focus the beam and enhance the brightness enhancement film or prism, wherein the warranty of the light guide plate and optical film products is generally over 10 years. However, the light source structure is a consuming goods; regardless of the cold or hot cathode fluorescent lamp or the light emitting diode, the warranty generally covers 1000~30000 hours (about 14~40 months), and the life of the light source structure is shorter than other components. As to the consumers, once the light source structure fails, the high-price LCD television (about tens of thousand U.S. dollars) cannot be used anymore. Further, the traditional backlight module usually fixes the light source structure and the light guide plate for the assembling; if any of the components is damaged, it takes complicated and laborious procedures to replace the component, which is very inconvenient to the consumers. Particularly, the larger LCD television has more than 20 lamps and a weight of several kilograms, plus the factor of the fragility of the lamp, which make the lamp replacement more difficult, or may even damage other lamps.

Therefore, many manufacturers have been focusing on the research and development of the lamp replacement structure. For example, the R.O.C. Patent Publication No. 342950 entitled "Lamp replacing structure of LCD screen" comprises a screen with an opening and a long groove on its side, and a lateral cover for facilitating the replacement of lamp in the lamp base. However, such patent only disclosed a lamp replacement structure, but did not teach the connection of the LCD screen with the circuit board, and thus did not clearly describe the overall LCD screen structure. Furthermore, the number of lamps in such patent is only two, but the current LCD television is generally over 20 inches and has more than 8 lamps. The lamp replacement structure of such patent no longer fits the LCD television with many lamps. In addition, such patent only disclosed the concept of a lamp replacement structure, but is not operable for the present LCD television (since the LCD television disclosed in the patent does not have a diffusion structure including the circuit board, light guide plate, and optical film, etc). It is the reason why there is no LCD television with detachable backlight module in the market yet.

SUMMARY OF THE INVENTION

The primary objective of the present invention is to solve and avoid the aforementioned shortcomings, and provide a detachable backlight module of the LCD television, so that consumers can replace the lamp of the LCD television easily. To accomplish the foregoing objective, the present invention comprises a casing with a detaching opening, a screen at the front section of the casing, a detachable lamp rack disposed at the rear of the screen and corresponding to the detaching opening, and a main circuit board disposed behind the detachable lamp rack; the main circuit board drives an illumination unit on the detachable lamp rack to evenly diffuse the light produced by the illumination unit through the screen to an area light source and the detachable lamp rack can be detached from the detachable opening easily, and the foregoing constitute the detachable backlight module of a LCD television.

To make it easier for our examiner to understand the objective of the invention, its structure, innovative features, and performance, we use a preferred embodiment together with the attached drawings for the detailed description of the invention.

BRIEF DESCRIPTION OF THE DRAWINGS

Other features and advantages of the present invention will become apparent in the following detailed description of the preferred embodiments with reference to the accompanying drawings, in which:

FIG. 4 is an illustrative diagram of a preferred embodiment of the present invention when it is in use.

DETAILED DESCRIPTION OF THE PREFERRED EMBODIMENTS

Figure 1:
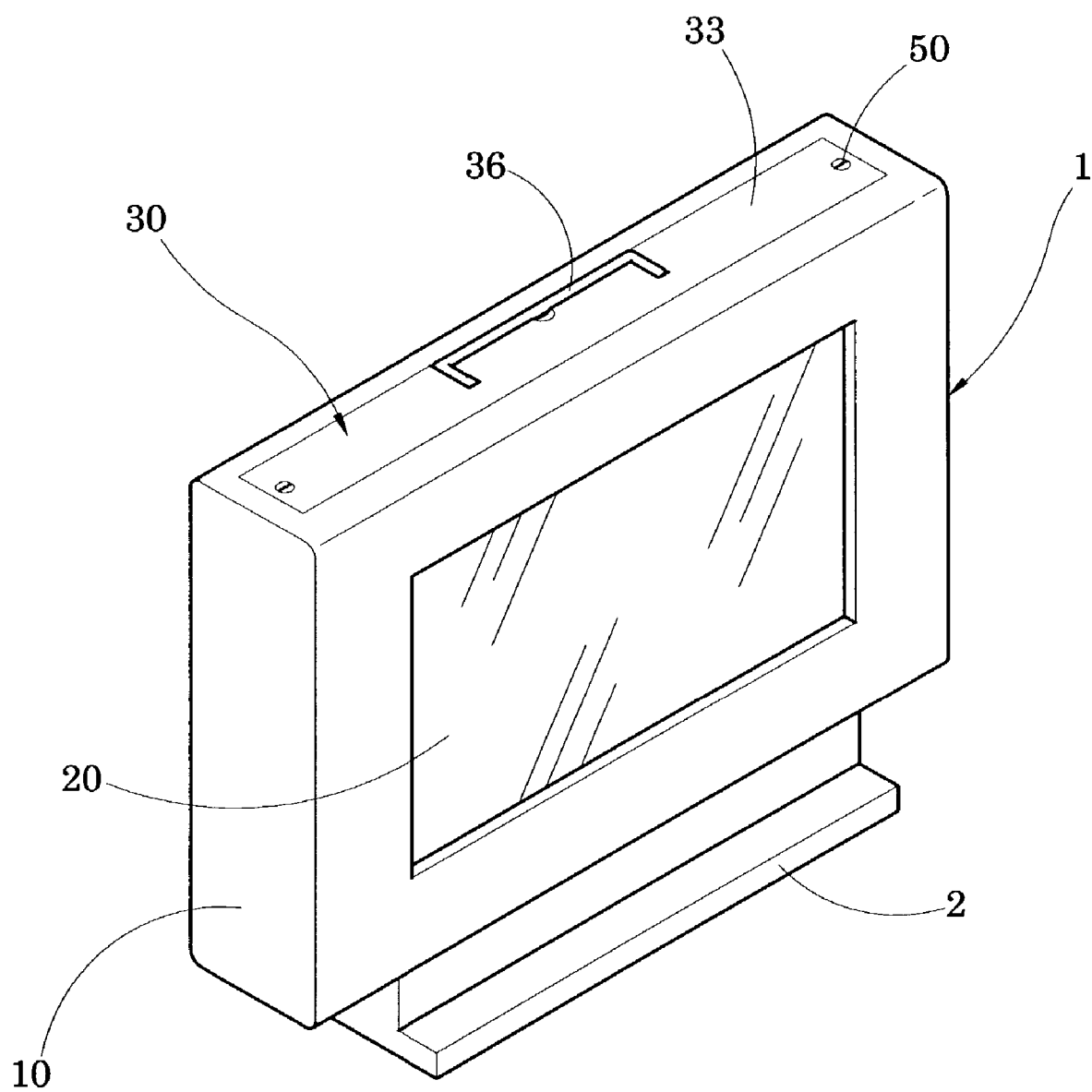
FIG. 1 is an illustrative diagram of the appearance of the present invention.
Figure 2:
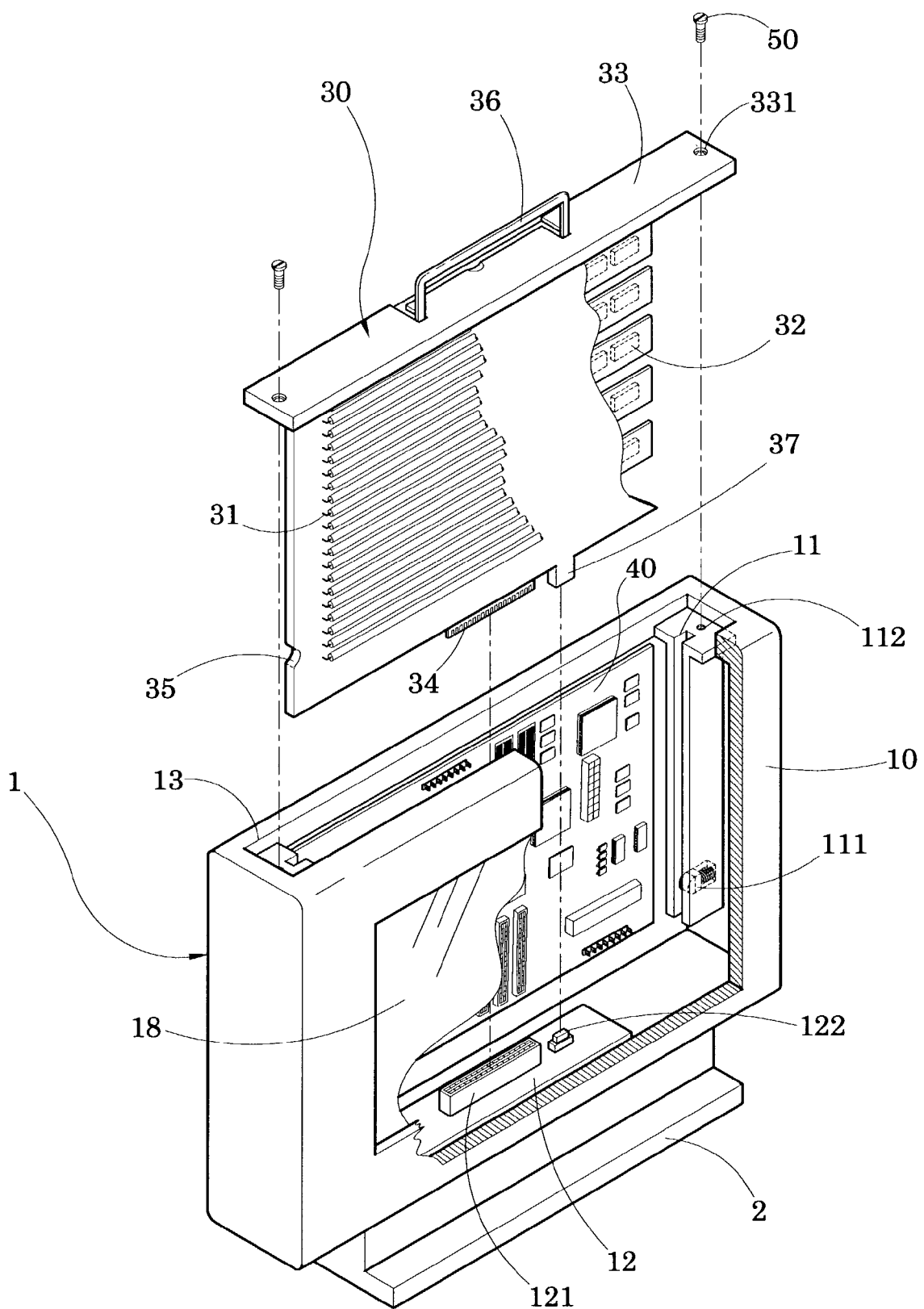
FIG. 2 is an illustrative diagram of the disassembled parts of the present invention.

Please refer to FIG. 1 and FIG. 2 for the appearance and illustration of the disassembled parts of the present invention. The present invention relates to a LCD television with detachable backlight module, comprising a casing 10 with a detaching opening 13, a screen 20 disposed at the front section of casing 10, a detachable lamp rack 30 disposed behind the screen 20 and having a plurality of illumination units 31 and a plurality of voltage transforming units 32, and a main circuit board 40 disposed behind the detachable lamp rack 30 and coupled to the illuminating units 31 and the voltage transforming units 32.

The casing 10 comprises a base 2 at its bottom to facilitate the disposition of the LCD television, a guiding groove 11 each on both sides of the detaching opening 13 for drawing the detachable lamp rack 30 out along the guiding groove 11, and a screen in the front section of the casing 10. The screen 20 further comprises a protective film, a prism, a diffusion film, and a light guide plate (not shown in the figure). A detachable lamp rack 30 is disposed behind the screen 20, and the path of displacement of such detachable lamp rack 30 is controlled by the guiding groove 11 in the casing 10, and such detachable lamp rack 30 further comprises a plurality of illumination units 31 and a plurality of voltage transforming units 32. The aforementioned illumination unit 31 could be cold cathode fluorescent lamp (CCFL), hot cathode fluorescent lamp (HCFL), or light emitting diode (LED), and the voltage transforming units could be ceramic transformer. Since ordinary CCFL or LED usually uses high voltage for the lighting, the more current passes the lamp, the brighter is the lamp. To compensate the brightness and evenness, the voltage transforming unit 32 is used to convert the voltage of the output power into high-voltage output. In addition, a cover 33 of the close guiding groove 11 on the detachable lamp rack 30 can prevent foreign substance from entering the casing 10 and affecting the brightness of the screen 20. A main circuit board 40 disposed behind the detachable lamp rack 30 is connected to the power supply, and such main circuit board connects to the detachable lamp rack 30 with the parallel cable (not shown in the figure) to drive the voltage transforming unit 32 and the illuminating unit 31 on the detachable lamp rack, and a daughter board 12 is disposed on the casing 10. The ports 121, 34 of the daughter board and detachable lamp rack 30 respectively reduce the complicated cable connection between the detachable lamp rack 30 and the main circuit board 40. The port 121 could be gold finger, which is connected to power supply through the main circuit board 30 or the daughter board 12 (not shown in the figure) when the port 121 is used. First of all, the power is sent to the voltage transforming unit 32, which converts the voltage into high-voltage output to drive the illumination unit 31, and finally the light produced by the illuminating unit 31 is converted into an even area light source and displayed on the screen 11.

Figure 3:
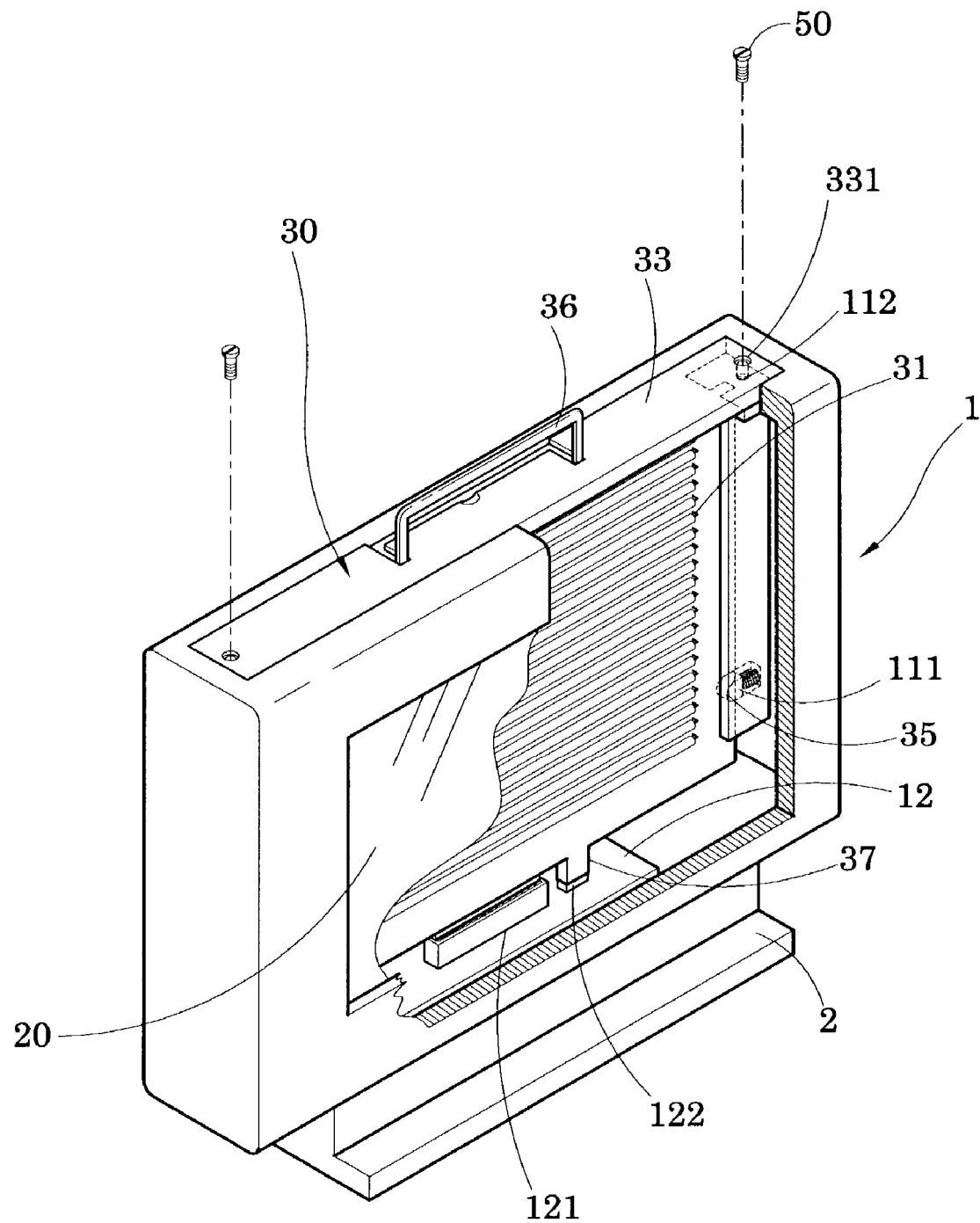
FIG. 3 is an illustrative diagram of the assembled status of the present invention.

Please refer to FIG. 3 for the illustrative diagram of the assembled status of the present invention. In the figure, if we want to install the detachable lamp rack 30, place the detachable lamp rack 30 into the guiding groove 11 on both sides of the casing 10 for the assembling. As long as the detachable lamp rack 30 is fully installed into the casing 10, the detached lamp rack 30 and the casing 10 are latched, and thus allows no shaking or vibration in the space created by the existence of components, since both of the guiding groove 11 and the detachable lamp rack 30 have corresponding latching members 111 and indentations 35. In addition, the casing 10 and the cover 33 have a fixing hole 112, 331, and the casing and the detachable lamp rack 30 can be fixed to the fixing hole 112, 331 respectively by the fixing members 50; such arrangement further secures the casing 10 and the detachable lamp into a fixed position. If we want to remove the detachable lamp rack 30, remove the fixing member 50 first. Although there are corresponding latching members 111 and indentations 35, the latching members and indentations 35 are in arc shape, and the latching members are elastic; therefore we just need to exert force to separate the detachable lamp rack 30 and the guiding groove 11. Further, a handle 36 is disposed on the detachable lamp rack 30 to facilitate the exertion of force and also the removal of the detachable lamp rack 30. A safety switch 122 and a control member 37 are disposed between the daughter board 12 on the casing and the detachable lamp rack 30 for the control of separating the detachable lamp rack 30 from the daughter board 12 and the control member 37 from the safety switch 122. At that time, the safety switch 122 will disconnect the power supply of the LCD television, which can prevent children from touching by mistake as well as the occurrence of accidents.

Please refer to FIG. 4 for an illustrative diagram of a preferred embodiment of the present invention. In the figure, besides having the guiding groove 11 on both of the internal left and right sides of the casing 10, we can also draw the detachable lamp rack 30 out from the top of the casing 10, or arrange the guiding groove 11' on both of the internal upper and lower sides of the casing 10. The detachable lamp rack 30' can be drawn out from the lateral detaching opening 13' by using the handle 36', and the cover 33' of the detachable lamp rack 30' is disposed on the lateral side of the casing 10'. A fixing hole 331', 112' are disposed on the cover 33' and the guiding groove 11' respectively, and the close guiding groove 11' is fixed by the fixing members 50. The remaining assembling sequence and application are the same as the foregoing description, and thus not mentioned here again.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

What is claimed is:

1. A LCD television with backlight module, comprising:
a casing having a front, back, top, bottom and two sides, and having a detaching opening;
a screen, disposed in the front of the casing;
a detachable lamp rack, corresponding to the detaching opening and disposed behind the screen, and said detachable lamp rack further comprising an illumination unit and a voltage transforming unit; and
a main circuit board, disposed at the back of said casing and behind the detachable lamp rack and coupled to the illumination units and the voltage transforming unit;
such that the main circuit board driving the illumination unit on the detachable lamp rack to evenly diffuse the light produced by the illumination unit into an area light source and display the light on the screen, and the detachable lamp rack being inserted and removed from the detaching opening in one of said two sides or said top, said lamp rack being between said screen and said main circuit board.

2. A LCD television with backlight module as claimed in claim 1,
wherein said casing having a base at its bottom.

3. A LCD television with backlight module as claimed in claim 1,
wherein said detaching opening of the casing on each of its lateral sides having a guide groove corresponsive to the detachable lamp rack.

4. A LCD television with backlight module as claimed in claim 3,
wherein said guiding groove and detachable lamp rack having a latching member and an indentation respectively.

5. A LCD television with backlight module as claimed in claim 3,
wherein said detachable lamp rack having a cover of the close guiding groove.

6. A LCD television with backlight module as claimed in claim 5,
wherein said casing and cover having a corresponding fixing hole.

7. A LCD television with backlight module as claimed in claim 1,
wherein said screen further comprising a protective film, a prism, a diffusion film, and a light guide plate.

8. A LCD television with backlight module as claimed in claim 1,
wherein said detachable lamp rack having a handle for facilitating the exertion of force.

9. A LCD television with backlight module as claimed in claim 1,
wherein said illuminating unit is a cold cathode fluorescent lamp (CCFL).

10. A LCD television with backlight module as claimed in claim 1,
wherein said illuminating unit is a hot cathode fluorescent lamp (HCFL).

11. A LCD television with backlight module as claimed in claim 1,
wherein said illuminating unit is a light emitting diode (LED).

12. A LCD television with backlight module as claimed in claim 1,
wherein said voltage transforming member is a ceramic transformer.

13. A LCD television with backlight module as claimed in claim 1,
wherein said main circuit board being coupled to the detachable lamp rack by a parallel cable.

14. A LCD television with backlight module as claimed in claim 1,
wherein said casing having a daughter board; the daughter board and the detachable lamp rack having a corresponding port safety switch and a control member.

15. A LCD television with backlight module as claimed in claim 14,
wherein said daughter board and the detachable lamp rack having a corresponding port.

16. A LCD television with backlight module as claimed in claim 15,
wherein said port is a golden finger.

* * * * *